United States Patent [19]

Wright et al.

[11] Patent Number: 4,778,128

[45] Date of Patent: Oct. 18, 1988

[54] FLYING DISC AIRCRAFT

[76] Inventors: Herbert H. Wright; Marcus A. Wright, both of 6415 Cabin Branch Ct., Capital Hts, Md. 20743

[21] Appl. No.: 836,418

[22] Filed: Mar. 5, 1986

Related U.S. Application Data

[63] Continuation-in-part of Ser. No. 723,723, Apr. 17, 1985, abandoned, which is a continuation of Ser. No. 430,707, Sep. 30, 1982, abandoned.

[51] Int. Cl.[4] .............................................. B64C 39/06
[52] U.S. Cl. ..................................... 244/23 C; 244/52
[58] Field of Search .................. 244/23 R, 23 C, 12.2, 244/34 A, 52

[56] References Cited

U.S. PATENT DOCUMENTS

| | | | |
|---|---|---|---|
| 3,383,073 | 5/1968 | Clover | 244/23 C |
| 3,633,849 | 1/1972 | Kling | 244/12.2 |
| 3,640,489 | 2/1972 | Jaeger | 244/23 C |
| 3,946,970 | 3/1976 | Blankenship | 244/23 C |
| 4,301,981 | 11/1981 | Hartt | 244/12.2 |
| 4,457,476 | 7/1984 | Andresevitz | 244/23 C |
| 4,461,436 | 7/1984 | Messina | 244/23 C |

Primary Examiner—Sherman D. Basinger
Assistant Examiner—Rodney Corl
Attorney, Agent, or Firm—Wigman & Cohen

[57] ABSTRACT

A flying disc aircraft includes a symmetrical body housing pilot and/or passenger seating apparatus above, a thrust-generating apparatus below, and a rotation inertia disc located therebetween. The disc rotates within the body in a plane normal to the axis of symmetry, and provides inertial stability for the aircraft through a gyroscopic effect. Directional control is achieved by means of mechanical linkage elements connecting a control stick at the pilot seating apparatus with the thrust-generating apparatus, the linkage allowing the pilot to orient the thrust at various angles relative to the aircraft axis of symmetry. Lift occurs when ambient air is induced, by virtue of the thrust-generating apparatus, to flow over the disc. In an alternate embodiment, lift is generated by the thrust-generating apparatus, and a shroud located beneath the apparatus is employed for redirecting resulting thrust to therefore facilitate directional control of the aircraft.

15 Claims, 7 Drawing Sheets (1)

FLYING DISC AIRCRAFT

CROSS REFERENCE TO RELATED APPLICATIONS

This present application is a continuation-in-part of U.S. Ser. No. 723,723, filed Apr. 17, 1985, which in turn is a continuation of U.S. Ser. No. 430,707, filed Sept. 30, 1982 (both now abandoned).

BACKGROUND OF THE INVENTION

The present invention relates to aircraft, and more particularly to heavier-than-air flying craft housing a propulsion unit and a rotating airfoil. The airfoil has the effect of generating inertial stability during rotation thereof, and has a configuration which cooperates with air flow induced through the aircraft to generate lift in a direction parallel to the axis of rotation of the air-foil.

In the past, various attempts have been made to produce lift for an aircraft by providing air flow over the surface of a rotating disc or airfoil.

For example, the patent to SCHELLIN (U.S. Pat. No. 3,831,884) shows an apparatus for generating lift which includes a rotating impeller located within a cavity. Upon rotation of the impeller, air enters the cavity to drive the blade assembly 27 in rotation. The air passing over blades 31 generates a pressure differential between the top and bottom surfaces thereof thereby producing lift.

In the PHILLIPS patent (U.S. Pat. No. 3,612,445), an aircraft is disclosed wherein lift is produced by directing air over the upper surface of an airfoil in a radial direction while the airfoil rotates.

Various other examples include the MUELLER patent (U.S. Pat. No. 3,525,484), which discloses a craft 10 having a disc-shaped wing and a propeller to induce flow of air over the wing thereby creating lift; the CLOVER patent (U.S. Pat. No. 3,383,073), which discloses an aircraft having a tiltable impeller for producing lift and propulsion; the McMASTERS patent (U.S. Pat. No. 3,321,156), which discloses a tiltable engine for generating upward thrust as well as directional movement; and the HAWKINS patent (U.S. Pat. No. 3,297,278), which shows an aircraft having an impeller to direct ambient air over the top of an airfoil to produce a lifting effect.

None of these patents disclose heavier-than-air flying vehicles in which both a propulsion source, and a lift producing apparatus are located within the perimeter of the aircraft body, and in which the lift-producing apparatus takes the form of a rotating airfoil for not only cooperating with air-flow induced by the propulsion unit to flow over the lift-producing surfaces of the airfoil to generate lift, but also to provide inertial stability for the vehicle when the latter is in flight.

OBJECTS OF THE INVENTION

It is therefore an object of the present invention to provide a heavier-than-air flying craft having a single element which both facilitates generation of lift, and contributes to the stability of the craft.

Another object of the present invention is to provide a heavier-than-air flying craft in which all moving parts are located entirely within the aircraft framework.

Still another object of the invention is to provide an aircraft having moving parts protected by a framework so that damage to such parts, through collision with stationary or moving objects, will be prevented.

Still another object is to provide an aircraft having complete internal symmetry.

Another object of the invention is to permit the pilot of an aircraft having an axis of symmetry to alter the direction of aircraft travel by reorienting the propulsive thrust relative to the axis of symmetry.

Yet another object of the invention is to provide for correspondence between the pilot's cabin in an aircraft and the direction of travel so that the former can be aligned with apparatus for altering the direction of thrust of the aircraft whereby the pilot can continuously observe where the aircraft is headed.

BRIEF DESCRIPTION OF THE DRAWINGS

Other objects and advantages of the present invention will become apparent from the following detailed description of the invention when considered in connection with the accompanying drawings, in which.

DETAILED DESCRIPTION OF A PREFERRED EMBODIMENT OF THE INVENTION

Referring now to the drawings in which like reference numerals correspond to similar or like parts, there is shown in FIGS. 1-9 the aircraft 10 of the present invention which includes a body or frame having an exterior of substantially trapezoidal profile symmetrical about an axis of symmetry A—A, and presenting a substantially saucer-like configuration. The air-craft, as shown, includes an upper passage-carrying section 100, a middle lift, propulsion and stability section 200 and a lower support section 300.

The upper section includes an entrance/exit hatch or door 102 connected to the aircraft in some conventional manner, a body or shell 104, a roof 106 and a plurality of panes or panels 108 of glass or other transparent material disposed circumferentially about the aircraft just below the roof. The plurality of panes or panels provide an operator (pilot) and crew with a viewing area of substantially 360° and therefore virtually eliminates any blind spot which might otherwise result.

Figure 3:
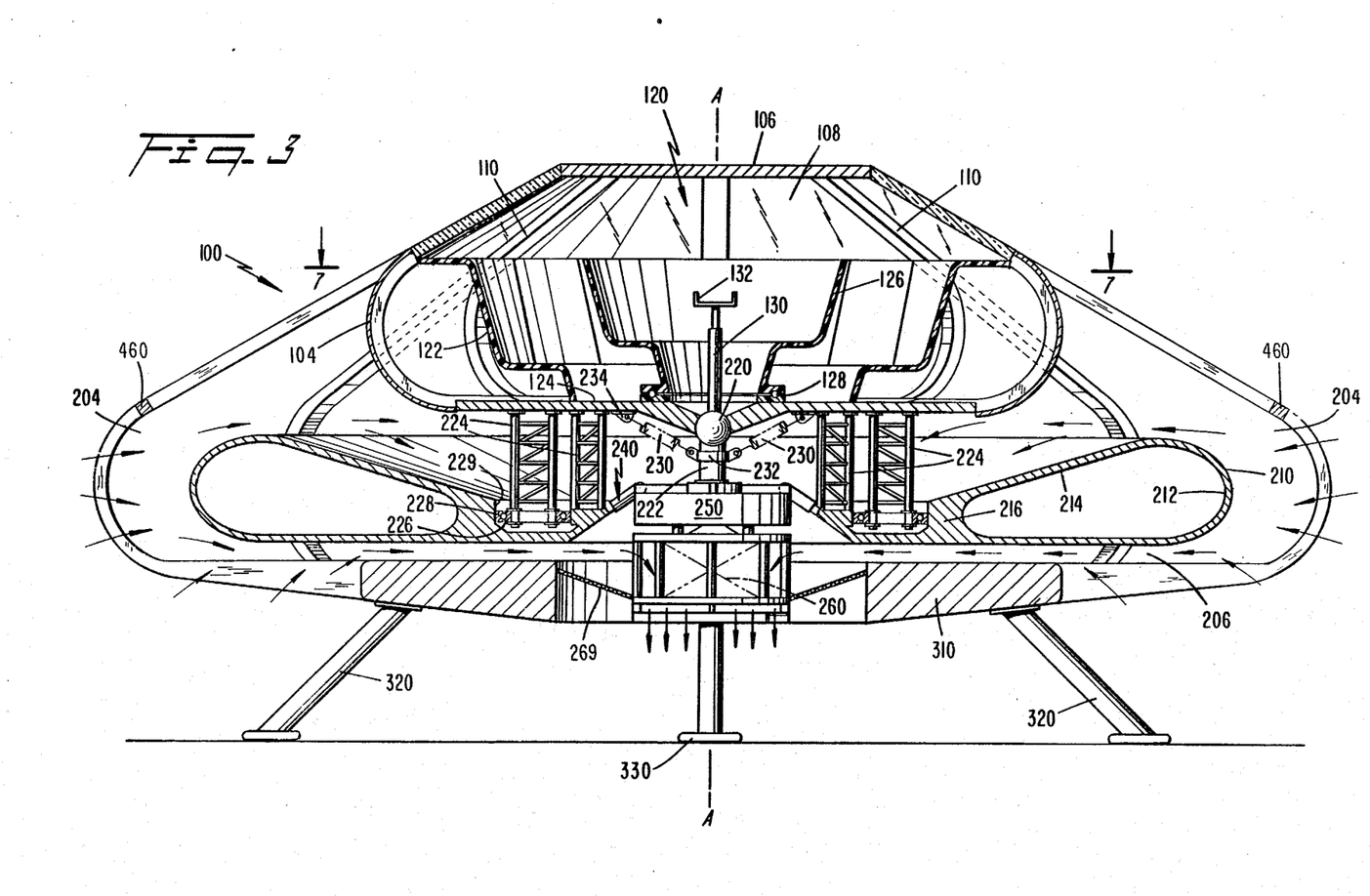
FIG. 3 illustrates, in partial section, the aircraft of FIG. 1 taken along section line 3—3 of FIG. 2.

The middle section 200 includes an air intake area 204 located at the widest diameter of the aircraft body. The vertical extent of the intake area is delimited by circumferentially extensive rail 460 at the upper extreme and by the plate member 310 at the lower extreme, while the intake opening is delimited by a plurality of ribs 110 extending radially from roof 106 and positioned at equally spaced locations about the circumference of the body. As shown in FIG. 3, a rotating wing or airfoil is housed within the body of the aircraft in region 206.

The lower section of the aircraft includes bottom plate member 310, a plurality of supporting legs or struts 320 extending downwardly from the plate member 310, and landing shoes 330, which terminate legs or struts 320, and on which is supported the aircraft. The shoes may take the form of wheels, pontoons, tires or other landing devices suitable for a particular terrain which the aircraft might reasonably be expected to encounter during its use.

In the upper section, the lateral edges of the ribs 110 desirably include mounting grooves or other mounting arrangements for holding, between adjacent ribs, the panes 108. The ribs in the middle section function as strengthening elements, and are preferably symmetrically disposed about the circumference of the aircraft.

Figure 1:
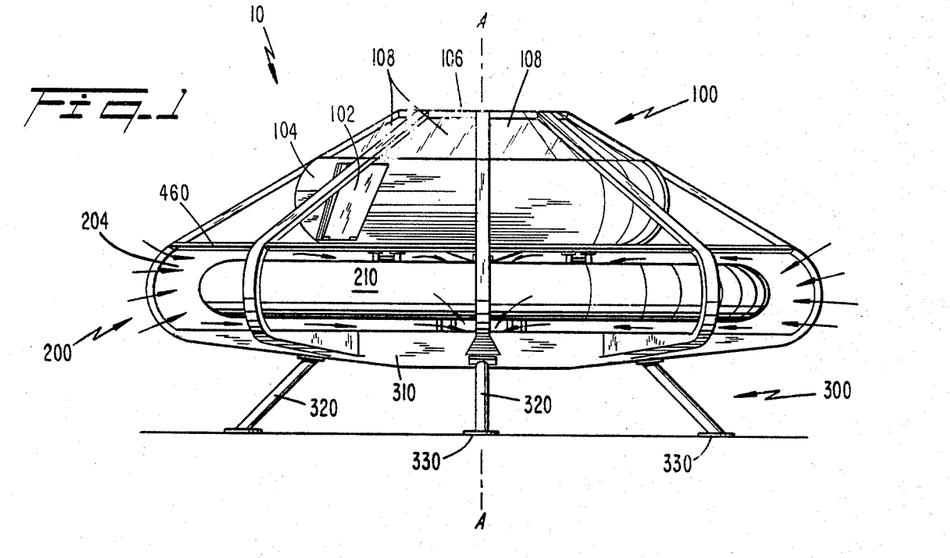
FIG. 1 is a side perspective view of the aircraft of the present invention.
Figure 2:
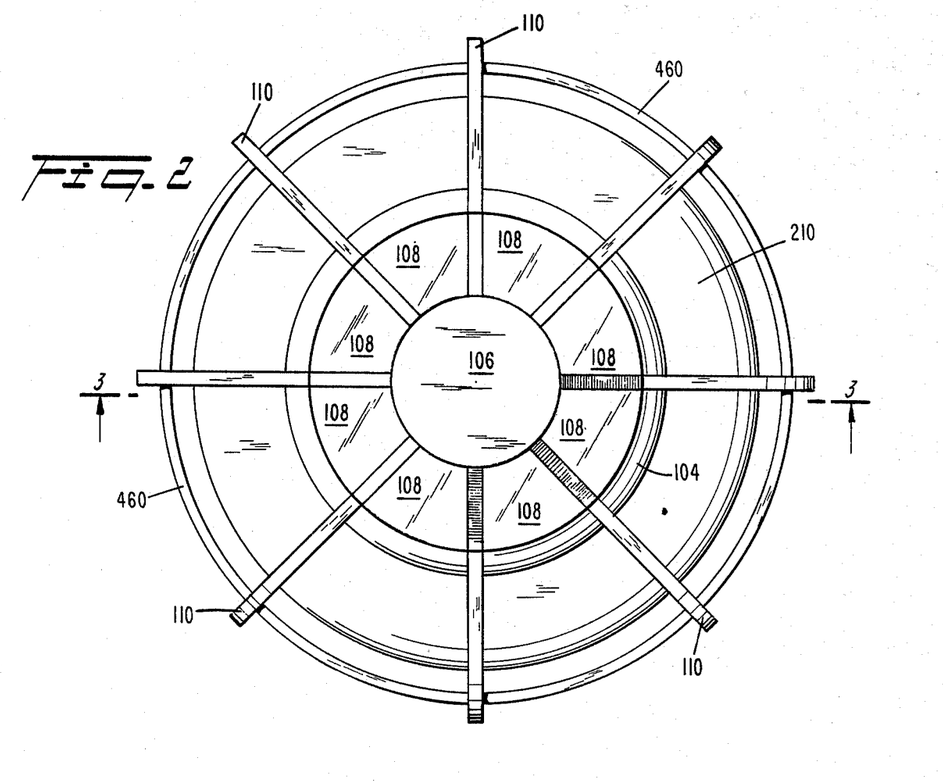
FIG. 2 is a top view of the aircraft of FIG. 1.

FIG. 3 illustrates a sectional view of the aircraft taken along section line 3—3 in FIG. 2. The upper section 100 is shown to include a cabin 120 housing passenger seating accommodations 122, such as, for example a molded contoured seat made of a lightweight synthetic material. The passenger seating accommodations are preferably nearly circular in configuration, are positioned concentric with the axis of symmetry of the aircraft, and are fixedly secured to the floor 124 of the cabin. Concentric with the passenger seating accommodations and disposed interiorly thereof is a pilot's seat 126, also of nearly circular configuration. The pilot's seat is mounted on the cabin floor via a bearing assembly which permits rotation of the seat about axis of symmetry A—A through a full 360°. This rotation is effected by conventional switching, motor and servo means, located for example in the cabin 120. Concentric with the pilot's seat and positioned substantially coaxially with the axis of symmetry of the aircraft is control stick 130 which facilitates directional control of the aircraft, as described in more detail below. Control stick 130 includes a rudder-and-trim control handle 132 positioned directly above and connected to the stick, which in turn is mounted directly above, and interconnected with, ball joint assembly 220 firmly secured in the cabin floor on the axis of symmetry.

Rotating wing or airfoil 210 comprises a hollow, doughnut-shaped, continuous airfoil mounted for rotation about outer shaft 222 in a plane substantially normal to the axis of symmetry of the aircraft, the outer shaft 222 being substantially coincident with the axis of symmetry. The airfoil configuration, as shown, has its greatest height at its leading edge 212 (in a direction parallel to the axis of symmetry) at its greatest radial extent. The lift-producing section 214 of the airfoil is located radially inwardly of the leading edge and extends between the axis of symmetry and the central support section 216 of the airfoil.

Figure 4:
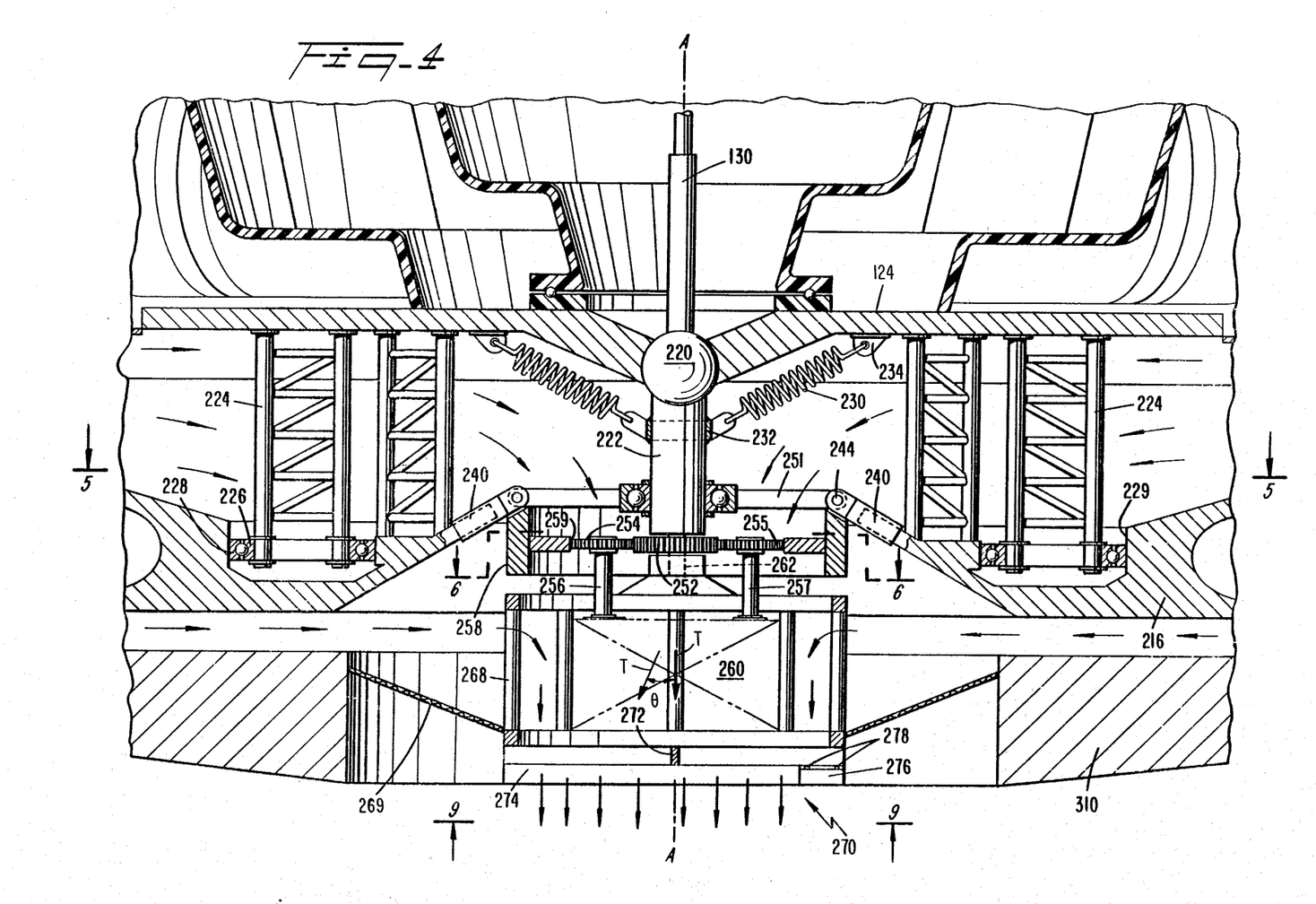
FIG. 4 is an enlarged sectional view of the power plant assembly and transmission assembly of the aircraft.
Figure 5:
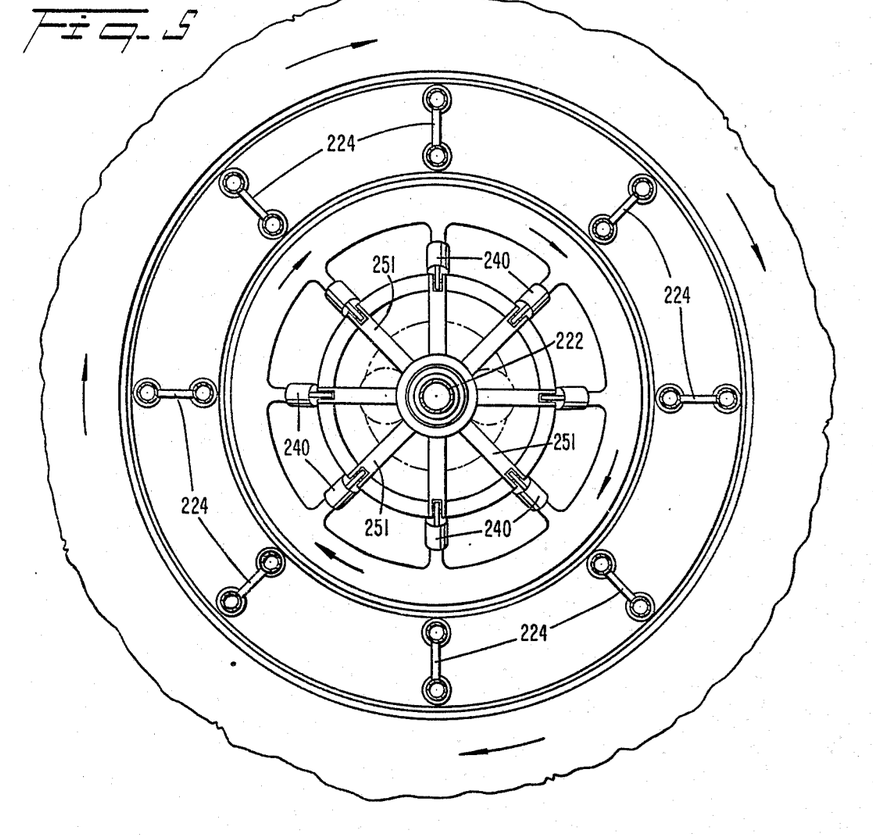
FIG. 5 shows the support and suspension apparatus for the power plant assembly, and is a view, partly in section, taken along section lines 5—5 in FIG. 4.

As shown in FIGS. 3 and 4, a plurality of stiffening members 224 are positioned radially outwardly of, and about, shaft 222. Each stiffening member is rigidly fixed at its upper end to the underside of cabin floor 124, and includes at its lower end a bearing assembly 226 which cooperates with a bearing assembly 228 carried by the support section 216 of the airfoil. These cooperating bearing assemblies permit the airfoil to be supported for rotation in a substantially horizontal plane. Each bearing assembly 228 may be positioned within well 229 for movement parallel to the shaft 222 along the walls of the well so that vibratory forces generated in the airfoil during rotation thereof may be accommodated without structural damage to the airfoil, the shaft, or the stiffening members. Additionally, damping apparatus is provided for minimizing vibratory forces which might otherwise be transmitted to the outer shaft 222 and then to the aircraft. A plurality of stability springs 230 interconnect a stability collar 232 with connection points 234 secured to the underside of floor 124. Preferably, at least two stability springs are provided, with the total number of springs being symmetrically positioned about shaft 222. The central support section 216 of the airfoil is also connected, albeit indirectly, to the shaft 222, via an assembly of shock absorbers 240. Each shock absorber interconnects the radially innermost portion of the airfoil central support section 216 with a pivot point 224 located on airfoil gearing housing struts 251 (see also FIGS. 4 and 5). In FIG. 5, eight shock absorbers and stiffening members are shown, but the number employed may be more or less depending on predetermined design requirements.

Figure 6:
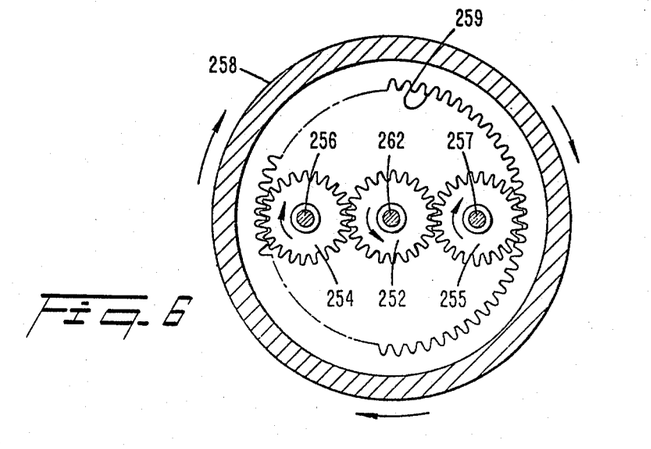
FIG. 6 is a view, partly in section, of the gear assembly shown in FIG. 4, taken along section lines 6—6 in FIG. 4.

The gearing housing 250 is positioned below stability collar 232 on shaft 222 within the vertical extent of the airfoil, and contains (see FIGS. 4 and 6) a main or sun gear 252 fixedly secured to a portion of rotating drive shaft 262 and concentric therewith. The drive shaft 262 is, as seen most clearly in FIG. 4, housed within outer shaft 222. The main gear 262 drives secondary or planet gears 254, 255 (only two gears have been shown for exemplary purposes), each of the planet gears being rotatably supported on respective gear shafts 256, 257 at a height appropriate for intermeshing with main gear 252. The side wall 258 of housing 250 is cylindrical in horizontal cross-section (as shown in FIG. 6), and includes an orbiting gear 259 on the inner surface thereof for engagement with the teeth of secondary gears 254, 255.

Through this gearing arrangement, rotary motion or torque generated in the power plant 260 is transmitted via shaft 262 to main gear 252. The rotation of the main gear drives the secondary gears which in turn drive the orbiting gear, and hence the gear housing 250. Thus rotary motion or torque generated in power plant 260 is transmitted to the airfoil or wing 210 via its interconnection with the gearing housing through shock absorber assembly 240. The range of speeds of revolution of airfoil 210 can, of course, be optimized not only by an appropriate selection of the power plant, but also by an appropriate design or selection of the gears.

Power plant 260, which may take the form of any conventional thrust-producing means (as for example a propeller or jet), functions both as an energy source for rotatably driving airfoil 210 as well as a means for providing the aircraft with thrust. The power plant, as seen in FIG. 4, is housed within a cage 268 and is rigidly connected via the shafts 256, 257 which support secondary gears 254, 255, in alignment with gearing housing 250. In order to provide directional thrust other than in purely upward and purely downward directions, the power plant has the capability of being tilted relative to the axis of symmetry so that, whereas the thrust axis T of the power plant is normally parallel with the aircraft axis of symmetry, when directional thrust is desired, the thrust axis T is displaced some angle $\theta$ from the axis of symmetry. In this way, the necessary components of horizontal and vertical thrust can be developed to attain the desired directional thrust. Through the linkage described above, the power plant can be directed at an angle $\theta$ to the axis of symmetry.

At the lowermost edge of cage 268 is attached a flexible air barrier 269 of elastic material. The barrier extends 360° around cage 268 upwardly toward an upper portion of the aircraft bottom plate 310.

Located below power plant 260 and attached to cage 268 is the rudder assembly 270 which, as shown in greater detail in FIG. 9, includes a first rudder 272, second rudder 274 and trim flap 276. The first and second rudders are disposed one above the other, respectively, and at right angles to one another. Trim flap 276 lies in the plane of the second rudder 274 when inoperative, and is supported by hinges 278, 278 for angular displacement on the hinges to either side of the second rudder when the flap is operative. The purpose of trim flap 276 is to impart refined directional control to the aircraft by directing a portion of the thrust developed by the power plant away from the main thrust component.

FIG. 5 is a view, partly in section, showing the appropriate spatial relationships between the airfoil, the stiffening members, the shock absorbers, the gearing housing struts, the shaft bearing 228, the outer shaft 222 and the drive shaft 262.

Figures 7, 8, 9:
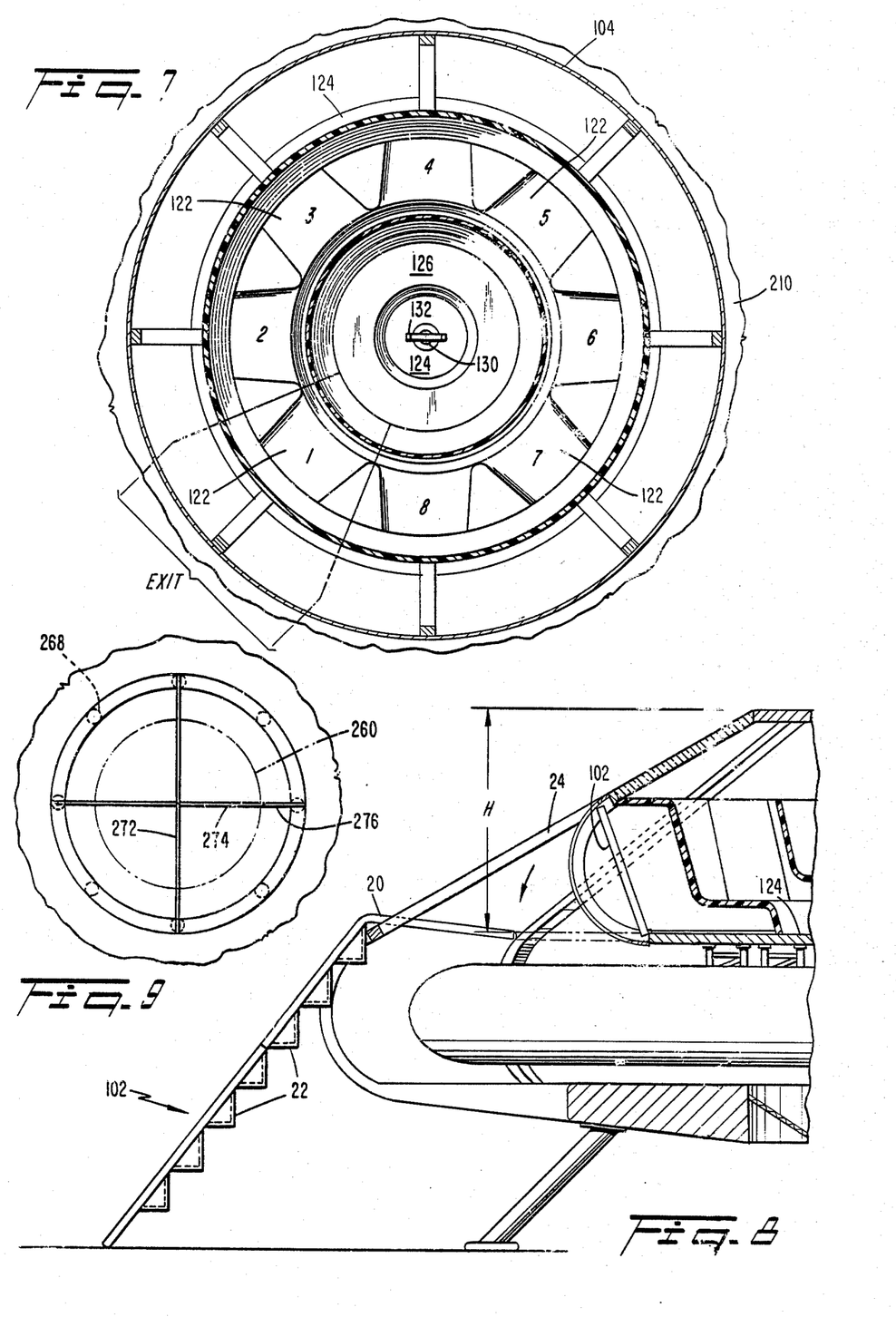
FIG. 7 is a partial sectional view of the cabin of the aircraft of the present invention, taken along section lines 7—7 of FIG. 3.
FIG. 8 illustrates, partly in section, the cabin with an entrance/exit hatch shown in its boarding mode of use.
FIG. 9 is a view, taken in the direction of arrows 9—9 in FIG. 4, of the rudder assembly at the underside of the aircraft.

FIG. 7 shows the passenger and pilot seating accommodations in the aircraft of the present invention. At the center of FIG. 7 is control stick 130 with the rudder-and-trim control handle 132. These control devices are secured through the cabin floor to the ball joint assembly 220 (see FIG. 3). Located radially outwardly of control stick 130 is the pilot's seat 126, and radially outwardly of the pilot's seat is the passenger seating accommodations 122, here shown divided, for example, into eight separate benches, all being unitarily interconnected with one another. Disposed radially outwardly of the passenger seating accommodations, between the circumferentially extending body wall 104, is the cabin floor 124. In FIG. 7, exit hatch 102 is shown positioned above that passenger seating bench denoted by the numeral "1", but its exact location is not critical. Moreover, it is not critical to have eight, or for that matter, any specific number of, discrete benches, and it would be most desirable to have either one of the benches temporarily destructible or foldable, or to have one less than a full complement of benches, so that ingress and egress to the aircraft seating accommodations could be attained.

FIG. 8 shows a ladder L having steps 22 by which the pilot and passengers can gain access to the seating accomodations of the aircraft. The ladder, in facilitating entrance to, and exit from, the aircraft cabin, includes a hook portion 20 in addition to steps 22. FIG. 8 clearly is not drawn to scale; access opening 24 as shown erroneously suggests that to enter or exit, the pilot and passengers must be very short or be on hands and knees. In fact, the aircraft upper section may be designed so that its height H may accommodate persons entering or exitng in an erect posture, and thus the height of the access opening may be selected in accordance with predetermined design requirements or expectations.

OPERATION OF THE PREFERRED EMBODIMENT

In nearly all heavier-than-air craft, in order to get off the ground and thus fly, lift must be developed to the extent that the weight of the craft is overcome. The same is true for the aircraft of the present invention. As best seen in FIG. 3, when the power plant 260 is operational, and downward thrust is generated, the air in region 206 upstream of, or just above, power plant 260 is moved through the power plant and in region 206, as a result of which ambient air is sucked or induced into the region at the intake areas 204 located peripherally about the circumference of the craft. After entering the region, the air encounters, and passes over and under, airfoil 210 creating, as a result of the sectional configuration in the vicinity of sloping surface 214, a negative pressure gradient thus resulting in the aerodynamic phenomena of lift relative to the region 206. In addition, rotation of the airfoil is effected by the linkage and gearing connecting it with the power plant 260. This rotation, at a predetermined speed, creates a stabilizing gyroscopic force.

To raise the craft off the ground, an appropriate thrust developed by power plant 260 is coupled with the lifting effect generated across rotating airfoil 210. Directional control of the craft is achieved by manipulation of control stick 130, rudder-and-trim control handle 132 and through appropriate linkages and servos interconnecting the control stick assembly with the power plant, so that angular orientation of the power plant relative to the craft axis of symmetry, as well as adjustment of the trim flap, can be facilitated.

DETAILED DESCRIPTION OF THE SECOND EMBODIMENT OF THE PRESENT INVENTION

Figure 10:
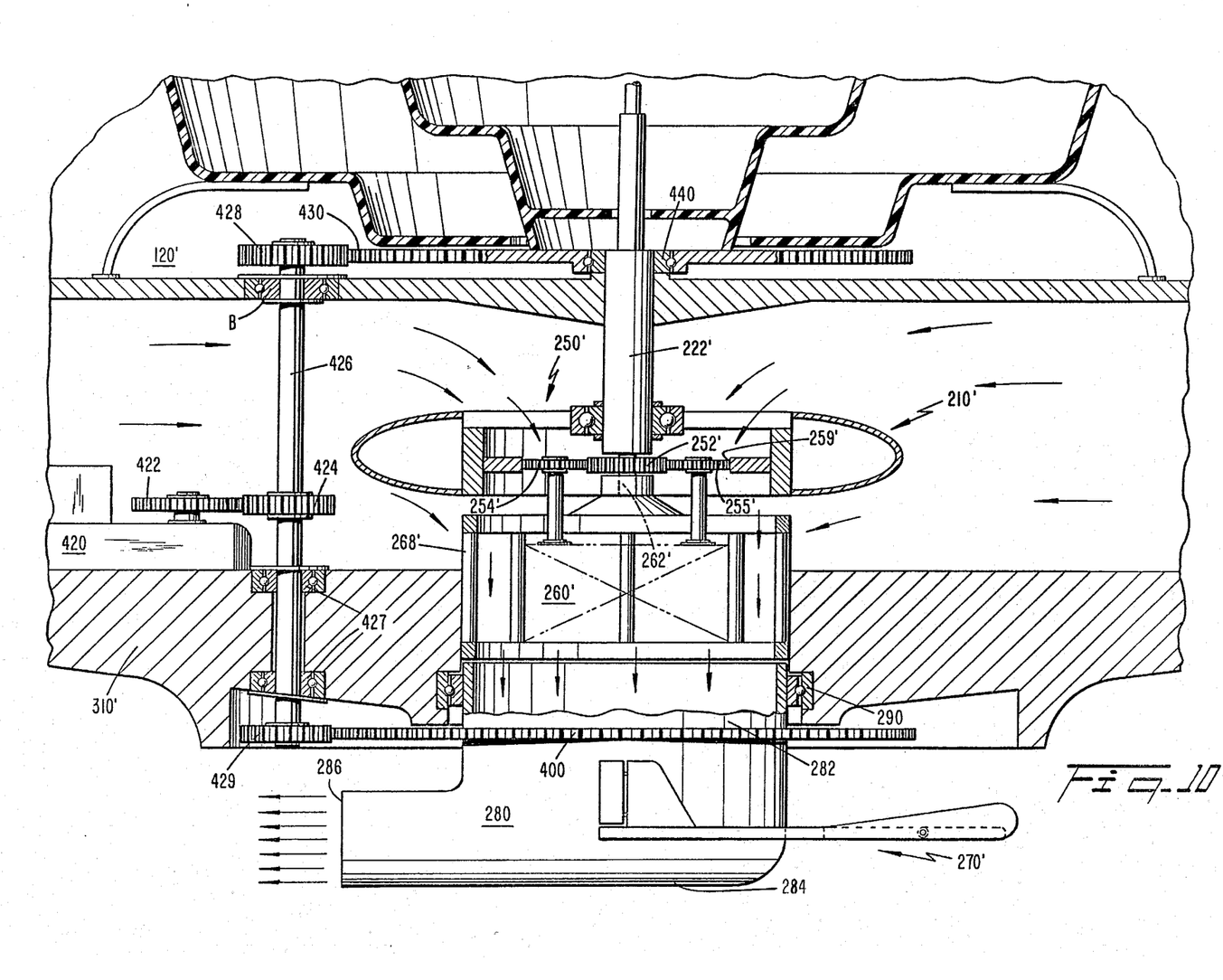
FIG. 10 illustrates, in partial section, a second embodiment of the present invention.
Figure 11:
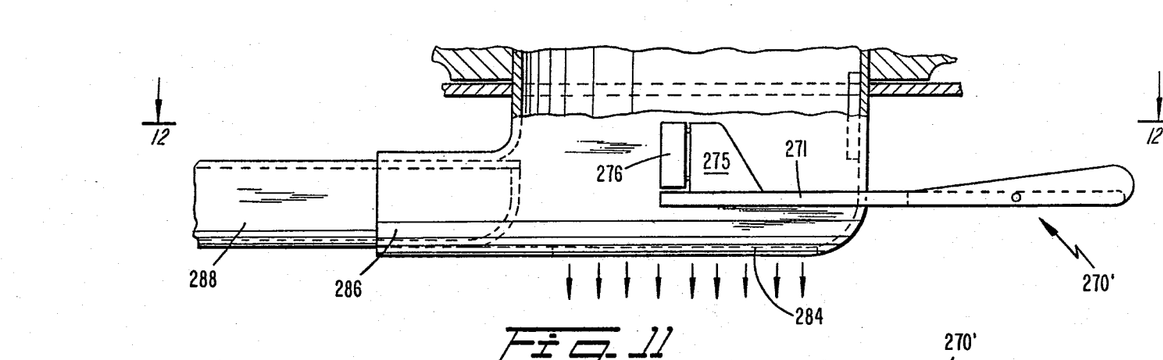
FIG. 11 is a side view, partly in section, of the rudder-and-trim assembly of the second embodiment.
Figure 12:
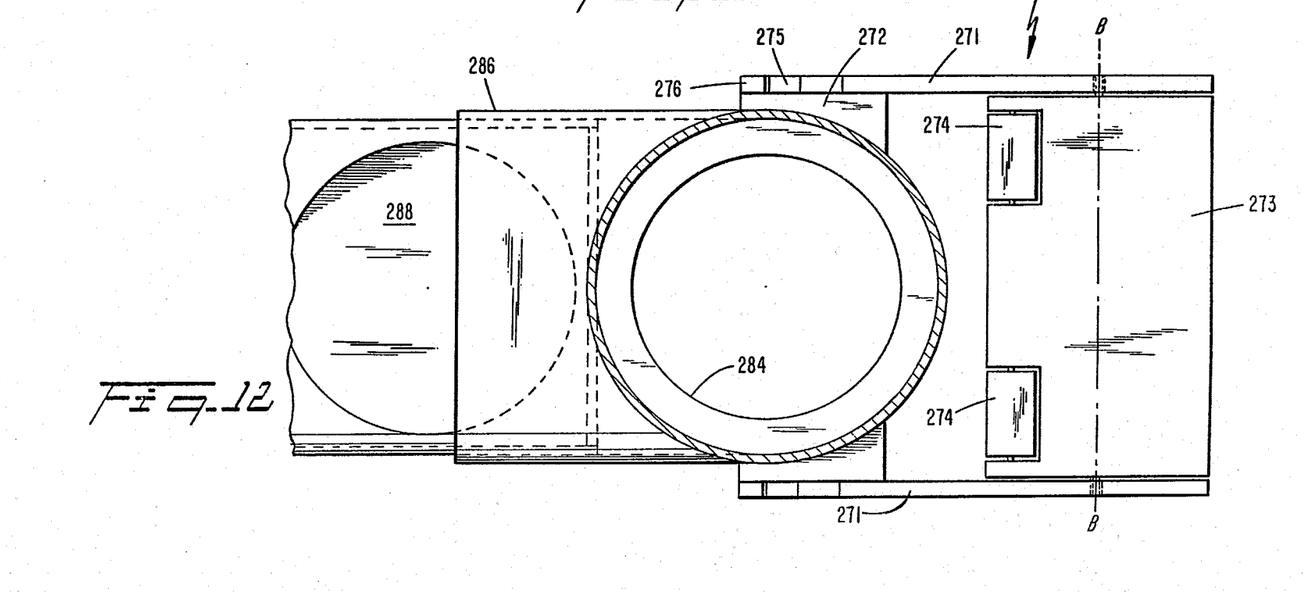
FIG. 12 is a view of the bottom of the rudder-and-trim assembly of FIG. 11, shown partly in section.

Referring now to FIGS. 10-12, there is shown a second embodiment of the inventive aircraft in which all components and elements shown are identical to those described above except where mentioned below. In this embodiment lift is achieved solely by the generation of downward thrust through power plant 260', stability achieved by rotation of a gyro 210' (which comprises a substantially solid ring-shaped element rigidly supported on shaft 222' at the same location at rotation wing or airfoil 210 was located), and directional control attained by means of a combined exhaust shroud 280 and rudder-and-trim unit 270'.

As shown in FIG. 10, and in a manner similar to that described above in connection with FIGS. 3, 4 and 6, torque generated by power plant 260' is transmitted through drive shaft 262' to main gear 252'. Rotation of the main gear drives secondary gears 254', 255' which in turn drives orbiting gear 259' and hence the gear housing 250'.

In this embodiment, directional control of the aircraft is achieved by altering the direction of thrust developed by power plant 260', not through tilting of the power plant as described in connection with the preferred embodiment, but rather through redirection of the thrust relative to the aircraft axis of symmetry. The exhaust shroud 280 is provided to effect this result, and comprises an L-shaped elbow pipe having an upper portion 282 rotatably supported, through bearing assembly 290, in bottom plate member 310. The upper portion is located directly below power plant cage 268', and has a substantially cylindrical configuration. The cage is fixed within bottom plate member 310' in an appropriate mounting opening coaxial with the axis of symmetry of the aircraft and the axes of the cage and the upper portion are in axial alignment. Mounted on the shroud about the exterior surface of the upper portion is shroud gear 400. The axis of rotation of the gear is, as shown, coincident with the aircraft's axis of symmetry. The lower portion of the exhaust shroud is disposed substantially normal to the upper portion and includes first exhaust valve 284, second exhaust valve 286 and rudder-and-trim unit 270'.

As shown in greater detail in FIGS. 11 and 12, first exhaust valve 284 comprises a substantially symmetrical opening located in the surface of the shroud most remote from the power plant and preferably directly beneath it. Slidably telescoped within second exhaust valve 286 is sleeve 288 which has a substantially cylindrical configuration with a cross-section congruous with the cross-section of the second exhaust valve.

When it is desired to lift the aircraft off the ground, sleeve 288 is telescoped outwardly from the second exhaust valve to its fully extended position thereby fully opening first exhaust valve 284. This permits purely downward thrust to be developed.

To generate horizontal components of thrust, the sleeve is moved toward its fully retracted position within the second exhaust valve, whereby the first exhaust valve becomes completely closed. The extent of retraction, and hence the extent to which the first valve is blocked off, determines the proportionate amount of thrust converted to a horizontal force component.

Rudder-and-trim unit 270' comprises side support frames 271, 271 extending oppositely away from the second exhaust valve and being attached at a first end thereof to mounting bracket 272 firmly affixed to the lower portion of the exhaust shroud. Spanning the second end of the support frames is wing 273 rotatable about axis B-B which extends substantially normal to the aircraft axis of symmetry. The wing is tiltable generally toward and away from the exhaust shroud upper portion. Carried by the wing along the edge adjacent the exhaust shroud are two flaps 274, 274 rotatable into and out of the plane of the wing. Positioned at the first ends of the side support frames and upstanding therefrom are fixed rudders 275, 275 and pivoting rudders 276, 276; the pivoting axes are substantially parallel with the aircraft axis of symmetry.

Directional control of the aircraft of this embodiment is also effected by reorienting the exhaust shroud about the axis of symmetry. This is accomplished by the provision of motor means 420, such as an electric motor, which turns motor gear 422. The motor gear in turn drives shaft gear 424, which is supported in a conventional manner on a shaft 426 spanning the passenger and pilot's cabin 120' with the bottom plate member 310', with bearing assemblies 427 being provided in appropriate places (two being shown by way of example). In the cabin, shaft 426 supports upper gear 428 which drives seating gear 430, the latter being supported on shaft 222' for rotation by bearing assembly 440. In the bottom plate member 310', shaft 426 supports lower gear 429 which drives shroud gear 400. Preferably, both the seat gear and the shroud gear are of the same diameter and thus are rotatably driven by motor 400 simultaneously at the same speed. As with the preferred embodiment described above, all movement of the rudder-and-trim unit, as well as movement of this shroud sleeve is effected through appropriate linkages and servos interconnecting the pilot's control stick and other necessary apparatus with the power plant.

Having described in this manner the fundamentals of the present invention and the manner in which it can be brought to practical use, I claim as my exclusive property the invention based on the following claims:

What is claimed is:

1. An aircraft, comprising:
    a frame having an axis of symmetry, and including means for delimiting an interior region communicating with ambient air;
    a rotatable body, including lift-generating surfaces, supported within said interior region with the axis of rotation of said body being substantially coincident with the axis of symmetry of said frame,
    thrust producing means, supported in said interior region beneath said body, and defining means for inducing movement of said ambient air through said interior region and over said lift-generating surfaces, whereby a lift force is generated which acts to overcome the weight of, and raise, the entire aircraft relative to the ground;
    means, coupled between said rotatable body and said thrust producing means, for driving said rotatable body in rotation about said axis of rotation;
    said body, when rotating, providing inertial stability for said aircraft; and
    means for altering direction of flight of said aircraft;
    said thrust producing means, said rotatable body, said driving means and said altering means all being disposed entirely within said frame.

2. The aircraft of claim 1, wherein
    said thrust-producing means produces a thrust component having a direction generally away from said interior region;
    said rotatable body comprises an annular airfoil having an axis of symmetry coincident with the axis of symmetry of said frame, and
    said interior region is symmetrical about said frame axis of symmetry.

3. The aircraft of claim 2, wherein
    said thrust-producing means is supported for pivoting movement relative to said frame axis of symmetry;
    and said altering mans comprises means for pivoting said thrust-producing means about said axis of symmetry to alter the direction of said thrust component relative to said axis of symmetry.

4. The aircraft of claim 3 further including
    pilot accommodations including seat means;
    and means for rotating said seat means about said frame axis of symmetry in direct correspondence to the altered direction of propulsion of said aircraft.

5. The aircraft of claim 1 further including
    pilot seat means, and means for rotating said seat means about said frame axis of symmetry;
    wherein said altering means comprises means for controlling the direction of flight of said aircraft,
    said pilot seat means being rotatable in a direction corresponding to the direction of flight.

6. The aircraft of claim 5 further including passenger seat means coupled to said pilot seat means for rotation therewith.

7. The aircraft of claim 1 wherein
    said altering means includes a shroud supported below said thrust-producing means, said shroud including means for directing thrust froms aid thrust-producing means in a first direction parallel to said axis of symmetry, means for redirecting said thrust in a second direction substantially normal to said first direction, and means, reciprocating in said shroud, having one position wherein said redirecting means is blocked, and at least one other position in which said redirecting means is at least partially open.

8. The aircraft of claim 7, wherein
said shroud comprises tubular means having a portion extending substantially normal to the frame axis of symmetry, and
said reciprocating means is telescopically supported for movement between said one position and said at least one other position.

9. The aircraft of claim 7 wherein
said frame includes means for rotating said shroud about the axis of symmetry of said frame.

10. The aircraft of claim 9 further including
pilot seat means, and
means for rotatably supporting said pilot seat means within said frame,
wherein said rotating means rotatably drives said pilot seat means in direct correspondence to rotation of said shroud.

11. The aircraft of claim 1 wherein
said altering means includes rudder means disposed beneath said thrust-producing means.

12. The aircraft of claim 11 wherein said rudder means is symmetric about said frame axis of symmetry.

13. The aircraft of claim 1 wherein
said aircraft includes means below said thrust-producing means for redirecting thrust produced by said thrust-producing means,
said rudder means being supported by said redirecting means.

14. The aircraft of claim 11 wherein
said rudder means comprises a first portion disposed in a plane normal to the frame axis of symmetry and a second portion disposed in a plane normal to plane of the first portion.

15. An aircraft, comprising:
a frame having an axis of symmetry, and including means for delimiting a region located entirely within said frame communicating with ambient air;
an annular body including lift-generating surfaces, said annular body being supported for rotation within said region and having an axis of rotation which is substantially coincident with the axis of symmetry of said frame;
means, supported in said region beneath said annular body, for producing a thrust component having a direction generally away from said region, said thrust component producing means constituting means for inducing movement of air from the ambient into, and through said region within, said frame, and over said lift-generating surfaces of said annular body so that a lifting force is generated which acts to overcome the weight of and impart lift to, the entire aircraft;
means, coupling said annular body with said thrust component producing means, for driving said annular body in rotation about said axis of rotation,
said body, when rotating, providing inertial stability for said aircraft; and
means for altering said direction of said thrust component relative to said axis of symmetry to control direction of flight of said aircraft;
said driving means including means for maintaining said axis of rotation substantially coincident with the axis of symmetry of said frame when said annular body is rotating, and when said altering means is operative to alter the direction of said thrust component relative to said axis of symmetry;
said thrust component producing menas, said annular body, said driving means and said altering means all being disposed entirely within said region.

* * * * *